T. GODFREY.
Cooking Utensil.
No. 41,338. Patented Jan. 19, 1864.
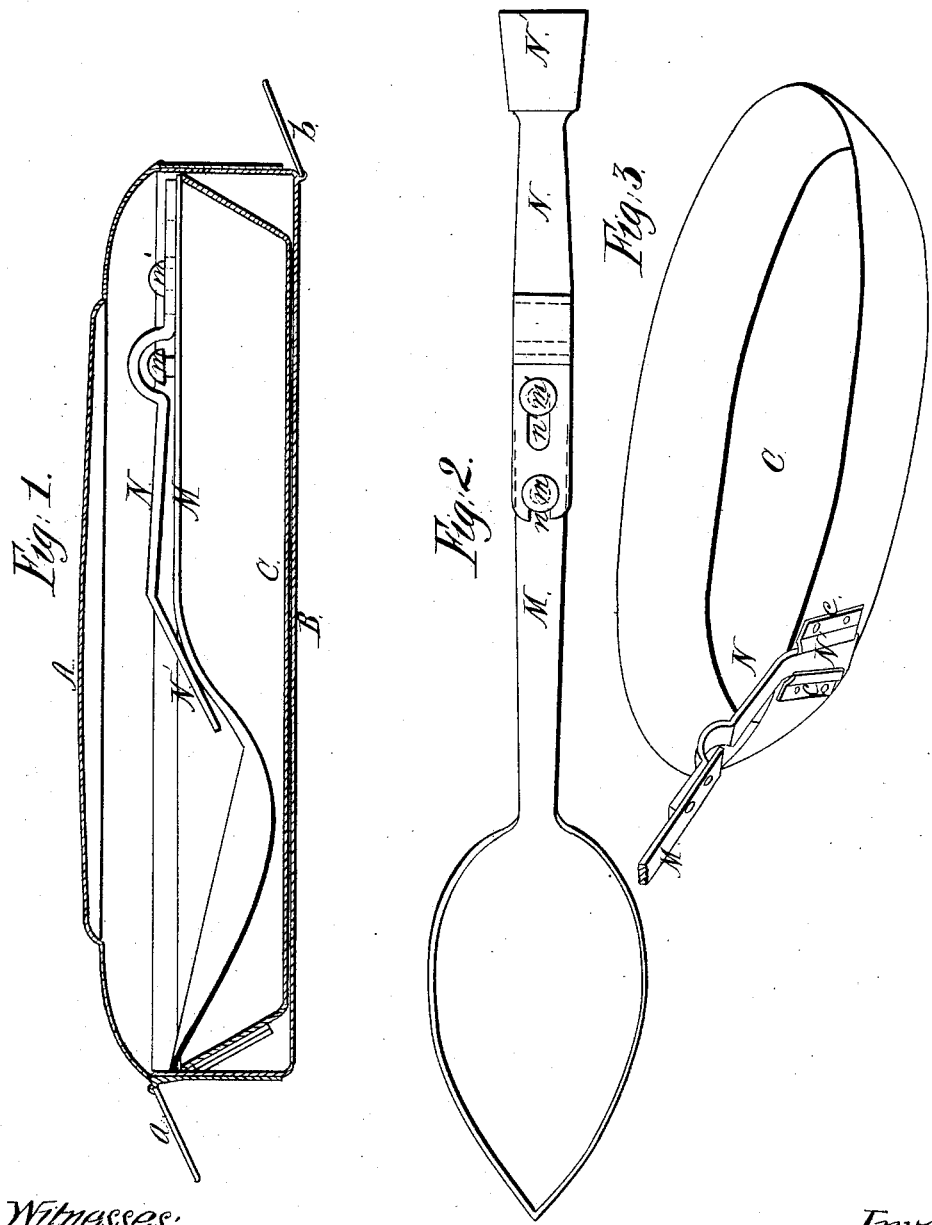

UNITED STATES PATENT OFFICE.

THOMAS GODFREY, OF NEW YORK, N. Y., ASSIGNOR TO HIMSELF AND CHAS., JOSEPH, AND HENRY TUCKER.

IMPROVEMENT IN COOKING UTENSILS.

Specification forming part of Letters Patent No. 41,338, dated January 19, 1864; antedated January 2, 1864.

*To all whom it may concern:*

Be it known that I, THOMAS GODFREY, of New York, in the county and State of New York, have invented a new and useful dining and cooking apparatus, intended more particularly for use by soldiers, but which is of service to all or any who may have occasion to carry and cook or to heat food while on journeys or at sea; and I do hereby declare that the following is a full and exact description thereof, reference being had to the accompanying drawings, forming a part of this specification, and to the letters of reference marked thereon.

In these figures similar letters denote like parts.

Figure 1 represents a vertical section of two parts, A and B, of the outer case, and of the inclosed pan C, together with a side elevation of a folded part, M N, which, when extended and made rigid, serves both as a detachable handle for the cooking-pan C and as an aid for eating the food.

Fig. 2 represents the said part M N in its extended condition, the free end of N having been made to describe a semicircle until N was in line with M, and then having been slid or thrust toward M, so as to cause the fork $n$ in N to embrace the rivet $m$, which is fixed in M, by sliding upon the other rivet $m'$ through the space allowed by the slot $n'$.

Fig. 3 shows in perspective a part of the handle N and the frying-pan C, permanently provided with small attachments $c\ c$. These latter are adapted to receive and firmly retain between them the dovetailed or widened end N' of the handle N, when the latter is introduced from below in a proper position, holding the parts rigidly in the relation represented in this figure until the handle N is again released from C by sliding it forcibly downward thereon.

My invention will be readily understood from the figures, and will be specially appreciated by soldiers who may be required to march with rations, either raw or nominally, but not actually cooked.

The several parts may be made of any suitable material, but for economy I prefer sheet-iron, either alone or covered with tin. The parts A and B, adapted to serve separately as meat-plate and soup-plate, are provided with rings $a$ and $b$, or other suitable means, for convenient attachment to the person, and B is fitted within A so tightly as to be retained under all ordinary concussions in transportation. The parts A and B may be provided with short screw-threads or partial lips, which will cause them to hold more firmly together and to release more freely when desired by turning one partly around upon the other, the rings $a$ and $b$ being located favorably to holding the parts in the locked condition while being carried. I have not considered such additions desirable for general purposes, and for economy of construction and facility of washing and wiping I prefer the plain form of A and B represented, both of which, it should be observed, may serve as a plate to retain the food after cooking.

The space within the case which is not filled by the handle M N may be filled with meat or other food either partly or fully cooked, or entirely raw, and it may be carried so inclosed until occasion calls for its use.

Having now fully described my invention, what I claim, and desire to secure by Letters Patent, is as follows:

Uniting the detachable part N of a cooking utensil with a spoon, M, or with a fork or the like as an equivalent therefor, by a joint which may be adjusted so as to be rigid or to fold or bend freely at pleasure, substantially as herein shown and described.

In testimony whereof I have hereunto set my hand in the presence of two subscribing witnesses.

THOS. GODFREY.

Witnesses:
BENJ. L. BILLINGE,
D. W. STETSON.